United States Patent
Jin et al.

(10) Patent No.: US 9,170,426 B2
(45) Date of Patent: Oct. 27, 2015

(54) ARRAY SUBSTRATE FOR LIQUID CRYSTAL DISPLAY DEVICE AND THREE-DIMENSIONAL IMAGE DISPLAY DEVICE INCLUDING THE SAME

(71) Applicant: LG Display Co., Ltd., Seoul (KR)

(72) Inventors: You-Yong Jin, Goyang-si (KR);
Kwang-Jo Hwang, Anyang-si (KR);
Eui-Tae Kim, Goyang-si (KR); Seok Kim, Paju-si (KR); Han-Chul Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 232 days.

(21) Appl. No.: 13/905,502

(22) Filed: May 30, 2013

(65) Prior Publication Data
US 2013/0321721 A1    Dec. 5, 2013

(30) Foreign Application Priority Data

May 31, 2012  (KR) .......................... 10-2012-0058044

(51) Int. Cl.
*G02F 1/1343* (2006.01)
*G02B 27/22* (2006.01)
*G02B 27/26* (2006.01)
*G02F 1/1362* (2006.01)

(52) U.S. Cl.
CPC ............ *G02B 27/22* (2013.01); *G02B 27/2228* (2013.01); *G02B 27/26* (2013.01); *G02F 1/134363* (2013.01); *G02F 1/13624* (2013.01); *G02F 1/136286* (2013.01); *G02F 2001/136245* (2013.01)

(58) Field of Classification Search
CPC ............ G02B 27/228; G02F 1/134363; G02F 1/13624; G02F 1/136286; G02F 2001/136245
USPC ............................. 349/15, 48, 139, 141, 144
See application file for complete search history.

(56) References Cited

U.S. PATENT DOCUMENTS

| | | | | |
|---|---|---|---|---|
| 7,388,639 | B2 * | 6/2008 | Kim .............................. | 349/141 |
| 2010/0289884 | A1 * | 11/2010 | Kang ............................. | 348/58 |
| 2011/0063557 | A1 * | 3/2011 | Kim et al. ..................... | 349/141 |

* cited by examiner

*Primary Examiner* — Paisley L Arendt
(74) *Attorney, Agent, or Firm* — Fenwick & West LLP

(57) ABSTRACT

An array substrate includes: a substrate; first and second gate lines on the substrate; first and second common lines parallel to and spaced apart from the first and second gate lines; first and second data lines crossing the first and second gate lines and the first and second common lines; first and second thin film transistors in the pixel region; a first pixel electrode and a first common electrode alternately disposed in the first area, at least one of the first pixel electrode and the first common electrode having a bent part; and a second pixel electrode and a second common electrode alternately disposed in the second area.

17 Claims, 9 Drawing Sheets

2D mode 3D mode 2D mode 3D mode

US 9,170,426 B2

ARRAY SUBSTRATE FOR LIQUID CRYSTAL DISPLAY DEVICE AND THREE-DIMENSIONAL IMAGE DISPLAY DEVICE INCLUDING THE SAME

CROSS-REFERENCE TO RELATED APPLICATIONS

The present application claims the priority benefit of Korean Patent Application No. 10-2012-0058044 filed in the Republic of Korea on May 31, 2012, which is hereby incorporated by reference in its entirety.

BACKGROUND

1. Field of the Disclosure

The present disclosure relates to an array substrate for a liquid crystal display device, and more particularly, to an array substrate for an in-plane switching mode liquid crystal display device where two-dimensional brightness and three-dimensional brightness are improved and a three-dimensional image display device including the array substrate.

2. Discussion of the Related Art

In general, a liquid crystal display (LCD) device uses an optical anisotropy and polarization properties of liquid crystal molecules to produce an image. Due to the optical anisotropy of the liquid crystal molecules, refraction of light incident onto the liquid crystal molecules depends upon an alignment direction of the liquid crystal molecules. The liquid crystal molecules have long thin shapes that can be aligned along specific directions. The alignment direction of the liquid crystal molecules can be controlled by applying an electric field. Accordingly, the alignment of the liquid crystal molecules changes in accordance with a direction of the applied electric field and the light is refracted along the alignment direction of the liquid crystal molecules due to the optical anisotropy, thereby images displayed.

Among various types of LCD devices, an active matrix type liquid crystal display (AM-LCD) device has been the subject of recent research due to its high resolution and superior quality for displaying moving images.

The LCD device includes a color filter substrate having a common electrode, an array substrate having a pixel electrode, and a liquid crystal layer interposed between the color filter substrate and the array substrate. In the LCD device, the liquid crystal layer is driven by a vertical electric field between the pixel electrode and the common electrode. Although the LCD device provides a superior transmittance and a high aperture ratio, the LCD device has a narrow viewing angle because it is driven by the vertical electric field. Accordingly, various other types of LCD devices having wide viewing angles, such as in-plane switching (IPS) mode LCD device, have been developed.

FIG. 1 is a cross-sectional view of an IPS mode LCD device according to the related art.

In FIG. 1, an upper substrate 9 and a lower substrate 10 face and are spaced apart from each other. A liquid crystal layer 11 is interposed between the upper and the lower substrates 9 and 10. The upper substrate 9 and the lower substrate 10 may be referred to as a color filter substrate and an array substrate, respectively. A common electrode 17 and a pixel electrode 30 are formed on the lower substrate 10. The liquid crystal layer 11 is driven by a horizontal electric field "L" between the common electrode 17 and the pixel electrode 30.

FIGS. 2A and 2B are cross-sectional views showing ON and OFF states, respectively, of an IPS mode LCD device according to the related art.

In FIG. 2A, voltages are applied to a pixel electrode 30 and a common electrode 17 to generate an electric field "L" having horizontal and vertical components. First liquid crystal molecules 11a of the liquid crystal layer 11 over the pixel electrode 30 and the common electrode 17 are not re-aligned by the vertical component of electric field "L," and a phase transition of the liquid crystal layer 11 does not occur. Second liquid crystal molecules 11b of the liquid crystal layer 11 between the pixel electrode 30 and the common electrode 17 are re-aligned by the horizontal component of electric field "L," and a phase transition of the liquid crystal layer 11 occurs. Because the liquid crystal molecules are re-aligned by the horizontal component of the electric field "L," the IPS mode LCD device has a wide viewing angle. For example, users can see images having a viewing angle of about 80° to about 85° along top, bottom, right and left directions with respect to a normal direction of the IPS mode LCD device.

In FIG. 2B, an electric field having a horizontal component is not generated when voltages are not applied to the IPS mode LCD device. Thus, first and second liquid crystal molecules 11a and 11b are not re-aligned, and a phase transition of the liquid crystal layer 11 does not occur.

FIG. 3 is a plan view showing an array substrate for an IPS mode LCD device according to the related art.

In FIG. 3, a plurality of gate lines 43, a plurality of common lines 47, and a plurality of data lines 60 are formed over a substrate 40. The plurality of gate lines 43 are parallel to the plurality of common lines 47 and cross the plurality of data lines 60 to define a plurality of pixel regions P. A thin film transistor (TFT) Tr is a switching element connected to the gate line 43 and the data line 60 and is formed in each pixel region P. The TFT Tr includes a gate electrode 45, a gate insulating layer (not shown), a semiconductor layer (not shown), a source electrode 53 and a drain electrode 55. The gate electrode 45 is a portion of the gate line 43 and the source electrode 53 is connected to the data line 60.

A passivation layer (not shown) is formed on the TFT Tr. In addition, a plurality of pixel electrodes 70a and 70b and a plurality of common electrodes 49a and 49b are formed on the passivation layer in the pixel region P. The plurality of pixel electrodes 70a and 70b are connected to the drain electrode 55 through a drain contact hole 67 in the passivation layer, and the plurality of common electrodes 49a and 49b are connected to the common line 47. The plurality of pixel electrodes 70a and 70b are parallel to and alternately disposed with the plurality of common electrodes 49a and 49b.

The pixel region P of the substrate 40 has a mono-domain structure where liquid crystal molecules in the pixel region P are aligned along one direction. As a result, a color shift phenomenon such that an undesired color image is displayed occurs along top, bottom, right and left directions with respect to a normal direction of the IPS mode LCD device. For example, a yellowish image may be displayed when the IPS mode LCD device is viewed along a top-left direction (10 o'clock), and a bluish image may be displayed when the IPS mode LCD device is viewed along top-right direction (2 o'clock). Accordingly, a display quality of the IPS mode LCD device is deteriorated.

For the purpose of improving the above disadvantages, an IPS mode LCD device of a two-domain structure has been developed where a plurality of pixel electrodes and a plurality of common electrodes have a bent part at a center portion of a pixel region.

FIG. 4 is a plan view showing an array substrate for an IPS mode LCD device having a two-domain structure according to the related art.

In FIG. 4, a plurality of gate lines 103, a plurality of common lines 109 and a plurality of data lines 115 are formed over a substrate 101. The plurality of gate lines 103 are parallel to the plurality of common lines 109 and cross the plurality of data lines 115 to define a plurality of pixel regions P. A thin film transistor (TFT) Tr is a switching element connected to the gate line 103 and the data line 115 and is formed in each pixel region P.

A plurality of pixel electrodes 170 and a plurality of common electrodes 173 are formed in the pixel region P. The plurality of pixel electrodes 170 are connected to the TFT Tr, and the plurality of common electrodes 173 are connected to the common line 109. The plurality of pixel electrodes 170 are parallel to and alternately disposed with the plurality of common electrodes 173.

Each of the plurality of pixel electrodes 170 and the plurality of common electrodes 173 has a bent part at a center portion of the pixel region P so that the IPS mode LCD device can have a two-domain structure where liquid crystal molecules in an upper half of the pixel region P are aligned along a first direction and liquid crystal molecules in a lower half of the pixel region P are aligned along a second direction different from the first direction. In the IPS mode LCD device having a two-domain structure, a color shift phenomenon along top-left, top-right, bottom-left and bottom-right directions is prevented by compensation of the two domains.

Recently, a switchable display device where a two-dimensional image and a three-dimensional image are selectively displayed has been suggested. In addition, a switchable display device using an IPS mode LCD device as a display panel has been researched. However, when the IPS mode LCD device according to the related art is applied to the switchable display device, a display quality such as brightness of a two-dimensional image and a three dimensional image is deteriorated.

The switchable display device may include a display panel and a retarder delaying a phase of light for displaying a three-dimensional image. A right-eye image and a left-eye image are alternately displayed in the display panel and the retarder is spaced apart from the display panel by a gap distance. While a width of a pixel region of the display panel for the two-dimensional image is determined regardless of the gap distance, a width of a pixel region of the display panel for the three-dimensional image is determined based on the gap distance. Accordingly, a width of the pixel region and a width of a border region between the pixel regions for the two-dimensional image are different from a width of the pixel region and a width of a border region between the pixel regions for the three-dimensional image. For example, a width of the border region between the pixel regions for the three-dimensional image may be greater than a width of the border region between the pixel regions for the two-dimensional image.

As a result, when the pixel region and the border region of the display panel are designed for the three-dimensional image, the width of the border region excessively increases for the two-dimensional image and brightness for the two-dimensional image decreases.

SUMMARY

Accordingly, the embodiments herein are directed to an array substrate for a display device that substantially obviates one or more of the problems due to limitations and disadvantages of the related art.

An object of the present disclosure is to provide an array substrate for a liquid crystal display device where brightness for a two-dimensional image is improved due to a pixel region having an asymmetric structure.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided an array substrate for a liquid crystal display device including: a substrate; first and second gate lines on the substrate, the first and second gate lines parallel to and spaced apart from each other; first and second common lines parallel to and spaced apart from the first and second gate lines; first and second data lines crossing the first and second gate lines and the first and second common lines, wherein a pixel region is surrounded by the first and second data lines and the first and second common lines, and wherein the pixel region includes a first area surrounded by the first and second data lines, the second gate line and the first common line and a second area surrounded by the first and second data lines, the first gate line and the second common line; first and second thin film transistors in the pixel region, the first and second thin film transistors connected to the first and second gate lines, respectively; a first pixel electrode and a first common electrode alternately disposed in the first area, at least one of the first pixel electrode and the first common electrode having a bent part; and a second pixel electrode and a second common electrode alternately disposed in the second area.

In another aspect, there is provided a three-dimensional image display device including: a liquid crystal panel including first and second substrates facing and spaced apart from each other and a liquid crystal layer between the first and second substrates, wherein the first substrate comprises: first and second gate lines on the first substrate, the first and second gate lines parallel to and spaced apart from each other; first and second common lines parallel to and spaced apart from the first and second gate lines; first and second data lines crossing the first and second gate lines and the first and second common lines, wherein a pixel region is surrounded by the first and second data lines and the first and second common lines, and wherein the pixel region includes a first area surrounded by the first and second data lines, the second gate line and the first common line and a second area surrounded by the first and second data lines, the first gate line and the second common line; first and second thin film transistors in the pixel region, the first and second thin film transistors connected to the first and second gate lines, respectively; a first pixel electrode and a first common electrode alternately disposed in the first area, at least one of the first pixel electrode and the first common electrode having a bent part; and a second pixel electrode and a second common electrode alternately disposed in the second area, and wherein the second substrate includes a color filter layer; first and second polarizing plates on outer surfaces of the first and second substrates, respectively; a backlight unit on an outer surface of the first polarizing plate; and a patterned retarder on an outer surface of the second polarizing plate, the patterned retarder having a phase difference of $\lambda/4$.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 1:
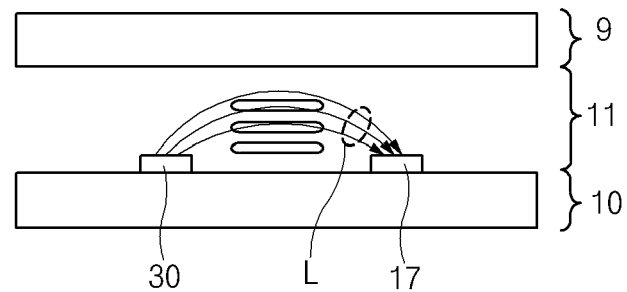
FIG. 1 is a cross-sectional view of an IPS mode LCD device according to the related art.
Figure 2A:
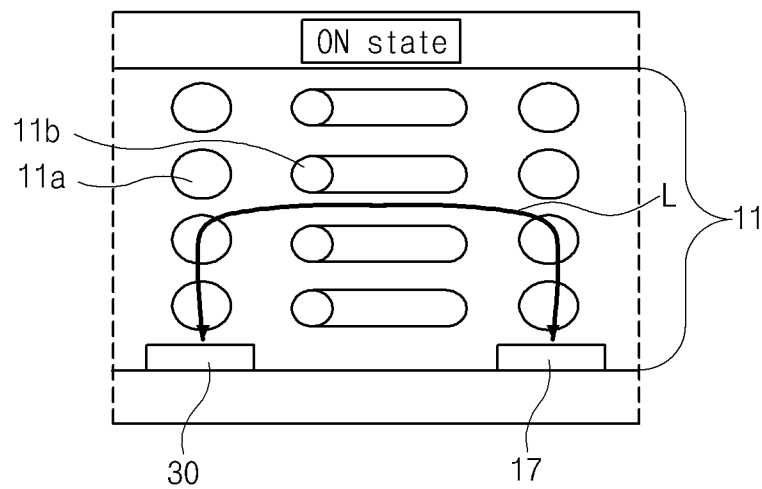
FIGS. 2A and 2B are cross-sectional views showing ON and OFF states, respectively, of an IPS mode LCD device according to the related art.
Figure 2B:
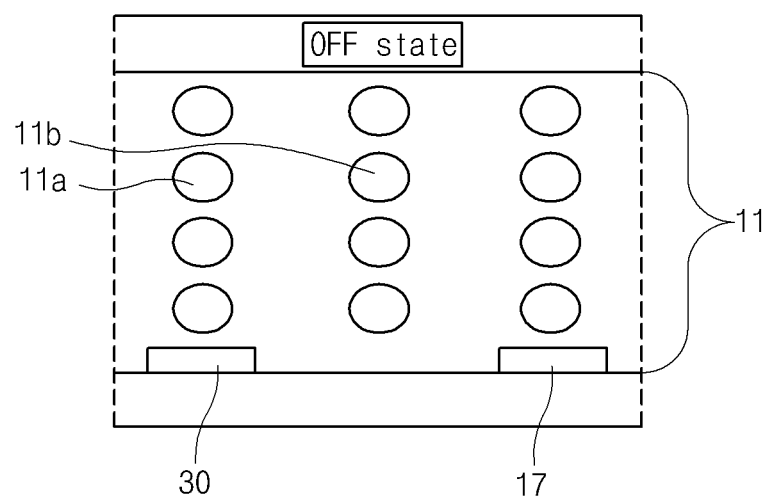
Figure 3:
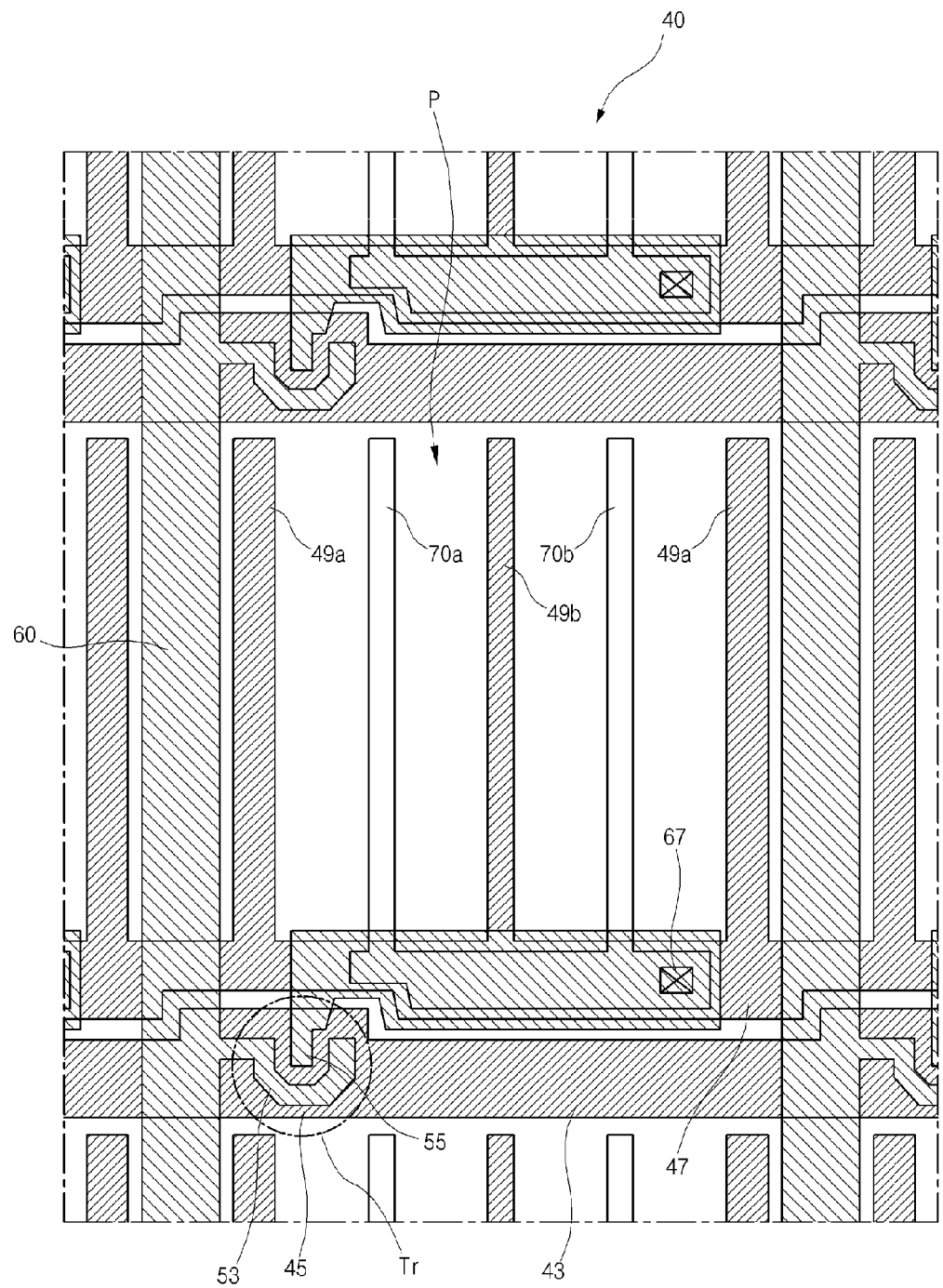
FIG. 3 is a plan view showing an array substrate for an IPS mode LCD device according to the related art.
Figure 4:
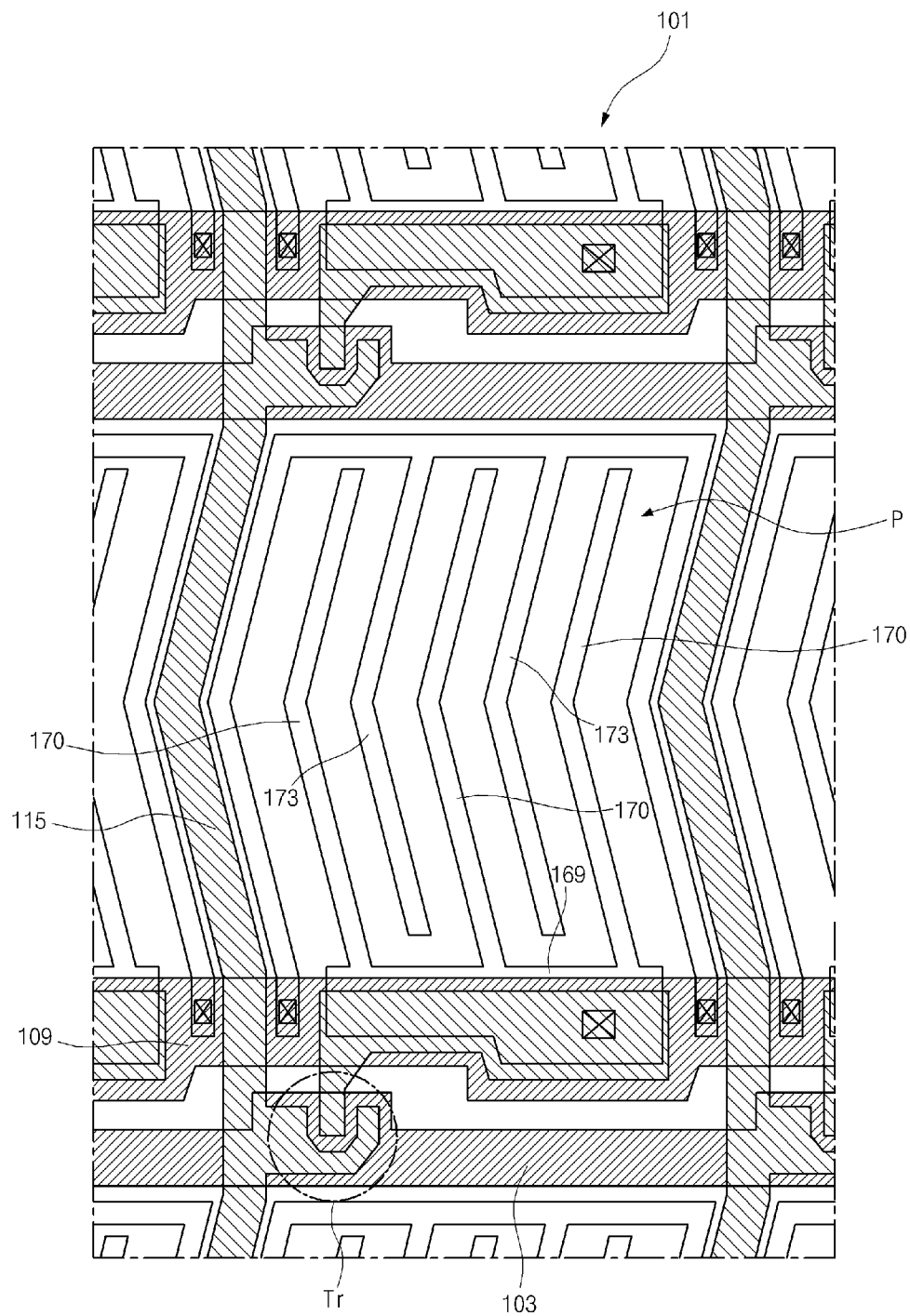
FIG. 4 is a plan view showing an array substrate for an IPS mode LCD device having a two-domain structure according to the related art.
Figure 5:
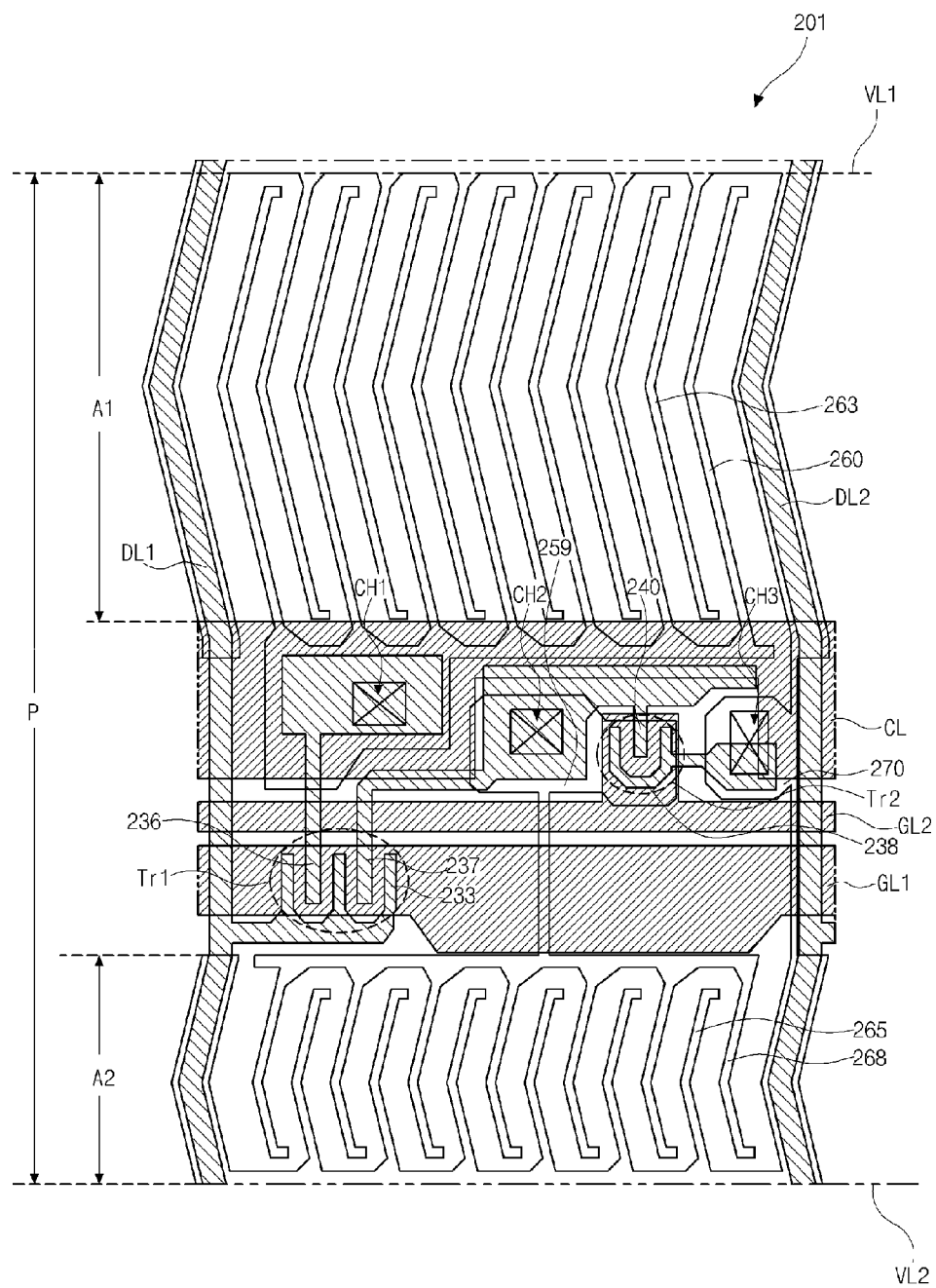
FIG. 5 is a plan view showing an array substrate for an IPS mode LCD device according to a first embodiment.

FIG. 5 is a plan view showing an array substrate for an in-plane switching (IPS) mode liquid crystal display (LCD) device according to a first embodiment.

In FIG. 5, first and second gate lines GL1 and GL2 and a common line CL are formed on a substrate 201. The first and second gate lines GL1 and GL2 and the common line CL are spaced apart from and parallel to each other, and the second gate line GL2 is disposed between the first gate line GL1 and the common line CL. In addition, first and second data lines DL1 and DL 2 crossing the first and second gate lines GL1 and GL2 and the common line CL are formed on the substrate 201.

In the substrate 201, a pixel region P is defined as an area surrounded by the first and second data lines DL1 and DL2 and first and second virtual lines VL1 and VL2 corresponding to end portions of first pixel electrodes 260 and end portions of second pixel electrodes 268, respectively. As a result, the pixel region P includes a first area A1 surrounded by the first and second data lines DL1 and DL2, the second gate line GL2 and the first virtual line VL1 and a second area A2 surrounded by the first and second data lines DL1 and DL2, the first gate line GL1 and the second virtual line VL2.

The first pixel electrode 260 and a first common electrode 263 spaced apart from each other are alternately disposed in the first area A1, and the second pixel electrode 268 and a second common electrode 265 spaced apart from each other are alternately disposed in the second area A2.

Each of the first and second pixel electrodes 260 and 268 and the first and second common electrodes 263 and 265 has a bar shape. In addition, each of the first and second pixel electrodes 260 and 268 and the first and second common electrodes 263 and 265 has a bent part at a center portion thereof to have a symmetric structure. Accordingly, each of the first and second areas A1 and A2 has a two-domain structure due to the symmetric structure having the bent part of the first and second pixel electrodes 260 and 268 and the first and second common electrodes 263 and 265.

First and second thin film transistors (TFTs) Tr1 and Tr2 are connected to the first and second gate lines GL1 and GL2, respectively. Each of the first and second TFTs Tr1 Tr2 includes a gate electrode, a semiconductor layer over the gate electrode and source and drain electrodes on the semiconductor layer.

A portion of the first gate line GL1 functions as the gate electrode of the first TFT Tr1 and the source electrode 233 of the first TFT Tr1 is connected to the first data line DL1. In addition, the first and second drain electrodes 236 and 237 of the first TFT Tr1 are spaced apart from the source electrode 233 to constitute two channels in the first TFT Tr1.

A portion of the second gate line GL2 functions as the gate electrode of the second TFT Tr2 and the source electrode 238 of the second TFT Tr2 is electrically connected to the common line CL. In addition, the drain electrode 240 of the second TFT Tr2 is spaced apart from the source electrode 238 of the second TFT Tr2 and is connected to the second drain electrode 237 of the first TFT Tr1.

The first pixel electrode 260 in the first area A1 is connected to the first drain electrode 236 of the first TFT Tr1 through a first contact hole CH1, and a first connection pattern 259 is connected to the second drain electrode 237 of the first TFT Tr1 through a second contact hole CH2. The first connection pattern 259 is connected to the second pixel electrode 268 in the second area A2. A second connection pattern 270 is connected to the source electrode 238 of the second TFT Tr2 and the common line CL through a third contact hole CH3. The first and second pixel electrodes 260 and 268 may have the same material and the same layer as the first and second common electrodes 263 and 265. In addition, the first and second connection patterns 259 and 270 may have the same material and the same layer as the first and second pixel electrodes 260 and 268 and the first and second common electrodes 263 and 265.

The second area A2 may be selectively driven according to a mode of the LCD device by turning on or off the second TFT Tr2. When the LCD device is driven in a 2D mode where a two-dimensional image is displayed, the first TFT Tr1 is turned on and the second TFT Tr2 is turned off. As a result, a data voltage of the first data line DL1 is applied to the first pixel electrode 260 in the first area A1 and the second pixel electrode 268 in the second area A2 through the first TFT Tr1, and a common voltage of the common line CL is applied to the first common electrode 263 in the first area A1 and the second common electrode 265 in the second area A2. Accordingly, both the first and second areas A1 and A2 of the pixel region P display a full-colored image in a 2D mode.

When the LCD device is driven in a 3D mode where a three-dimensional image is displayed, the first and second TFTs Tr1 and Tr2 are turned on. As a result, the data voltage of the first data line DL1 is applied to the first pixel electrode 260 in the first area A1, and the common voltage of the common line CL is applied to the first common electrode 263 in the first area A1 and the second common electrode 265 in the second area A2. Since the second TFT Tr2 is turned on, the common voltage of the source electrode 238 of the second TFT Tr2 is transmitted to the drain electrode 240 of the second TFT Tr2. Accordingly, the common voltage of the common line CL instead of the data voltage of the first data line DL1 is applied to the second pixel electrode 268 in the second area A2 and the second area A2 displays a black image. Therefore, the first area A1 of the pixel region P displays a full-colored image and the second area A2 of the pixel region P functions as a black stripe for preventing deterioration such as a three-dimensional crosstalk in a 3D mode.

In the IPS mode LCD device including the array substrate 201, since the first and second areas A1 and A2 are used for displaying a two-dimensional image, aperture ratio and brightness of a two-dimensional image are improved in a 2D mode. In addition, since first area A1 is used for displaying a three-dimensional image and the second area A2 is used as a black stripe, display quality of a three-dimensional image is improved in a 3D mode.

Since liquid crystal molecules corresponding to the bent part are not properly re-aligned due to an electric field having components along different directions, a disclination area displaying a black image or an undesirable-colored image instead of a full-colored image is formed at a portion of the bent part of the first and second pixel electrodes 260 and 268 and the first and second common electrodes 263 and 265 in the first and second areas A1 and A2. In addition, since the liquid crystal molecules corresponding to the end portions of the first and second pixel electrodes 260 and 268 and the first and second common electrodes 263 and 265 are not properly re-aligned due to an electric field having components along different directions, the disclination area is also formed at the end portions of the first and second pixel electrodes 260 and 268 and the first and second common electrodes 263 and 265. As a result, improvement in brightness of a two-dimensional image of the IPS mode LCD device including the array substrate 201 is limited due to the disclination area.

For the purpose of further improving brightness, an array substrate for an IPS mode LCD device is suggested in a second embodiment.

Figure 6:
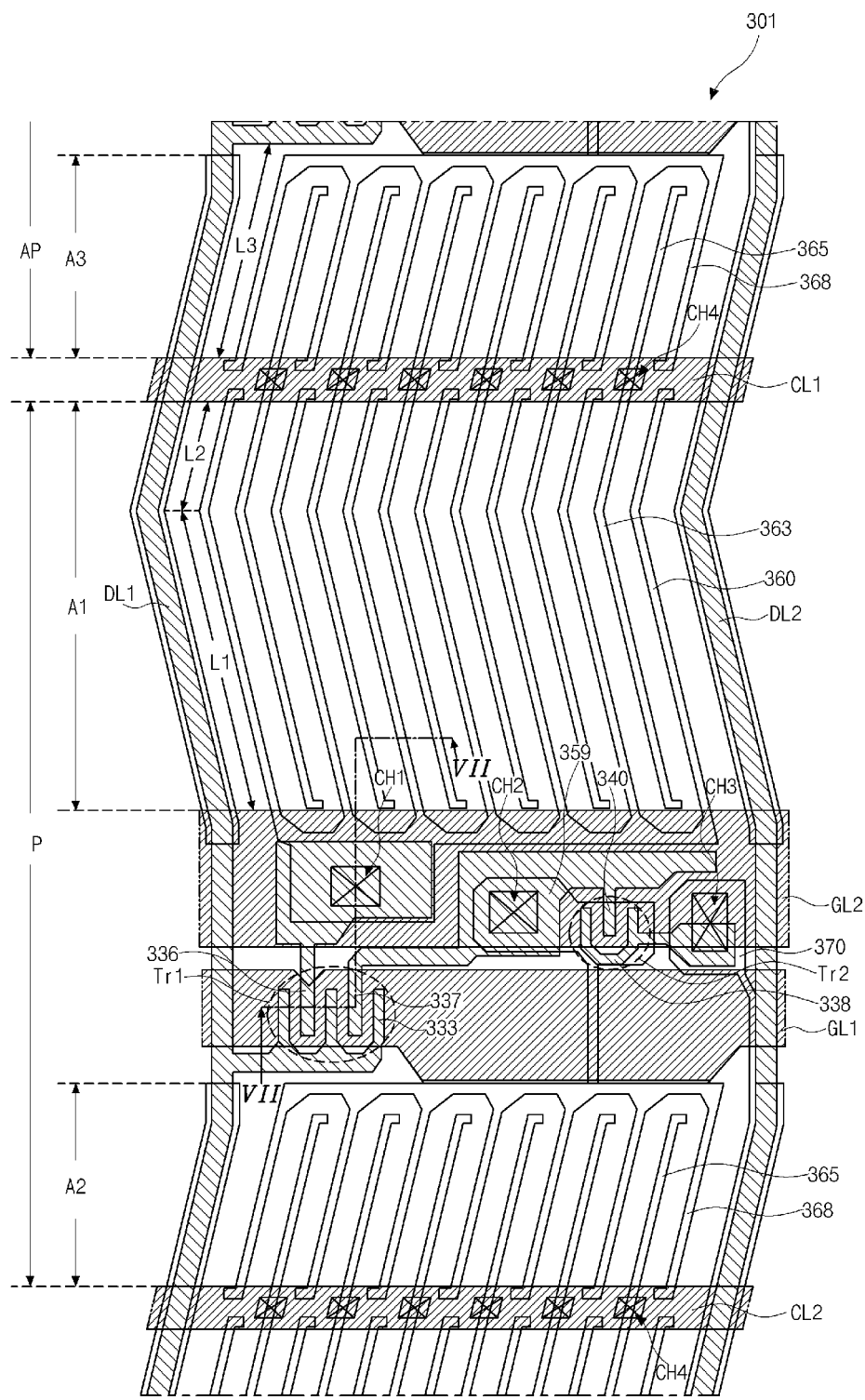
FIG. 6 is a plan view showing an array substrate for an IPS mode LCD device according to a second embodiment.

FIG. 6 is a plan view showing an array substrate for an in-plane switching (IPS) mode liquid crystal display (LCD) device according to a second embodiment.

In FIG. 6, first and second gate lines GL1 and GL2 and first and second common lines CL1 and CL2 are formed on a substrate 301. The first and second gate lines GL1 and GL2 and the first and second common lines CL1 and CL2 are spaced apart from and are parallel to each other. The second gate line GL2 is disposed between the first gate line GL1 and the first common line CL1, and the first gate line GL1 is disposed between the second gate line GL2 and the second common line CL2. In addition, first and second data lines DL1 and DL2 crossing the first and second gate lines GL1 and GL2 and the first and second common lines CL1 and CL2 are formed on the substrate 301.

In the substrate 301, a pixel region P is defined as an area surrounded by the first and second data lines DL1 and DL2 and the first and second common lines CL1 and CL2. As a result, the pixel region P includes a first area A1 surrounded by the first and second data lines DL1 and DL2, the second gate line GL2 and the first common line CL1 and a second area A2 surrounded by the first and second data lines DL1 and DL2, the first gate line GL1 and the second common line CL2.

A first pixel electrode 360 and a first common electrode 363 spaced apart from each other are alternately disposed in the first area A1, and a second pixel electrode 368 and a second common electrode 365 spaced apart from each other are alternately disposed in the second area A2. The first and second common electrodes 363 and 365 are electrically connected to the first and second common lines CL1 and CL2, respectively, through a fourth contact hole CH4. Each of the first and second pixel electrodes 360 and 368 and the first and second common electrodes 363 and 365 has a bar shape.

In addition, each of the first pixel electrode 360 and the first common electrodes 363 has a bent part, and each of the second pixel electrode 368 and the second common electrode 365 does not have a bent part. The bent part may not be disposed at a center portion of each of the first pixel electrode 360 and the first common electrodes 363. Instead, the bent part may be disposed at a biased portion of each of the first pixel electrode 360 and the first common electrode 363 adjacent to the first common line CL1. For example, the bent part may be disposed at a center portion of a united region of the first area A1 of the pixel region P and a third area A3 of an adjacent pixel region AP. The third area A3 of the adjacent pixel region AP corresponds to the second area A2 of the pixel region P. When each of the first pixel electrode 360 and the first common electrodes 363 has lower and upper portions with respect to the bent part, a first length L1 of the lower portion of each of the first pixel electrode 360 and the first common electrodes 363 in the first area A1 of the pixel region P may be substantially the same as a sum of a second length L2 of the upper portion of each of the first pixel electrode 360 and the first common electrodes 363 in the first area A1 of the pixel region P and a third length L3 of each of the second pixel electrode 368 and the second common electrode 365 in the third area A3 of the adjacent pixel region AP.

When the LCD device is driven in a 2D mode where a two-dimensional image is displayed, a two-domain structure is obtained in the united region of the first area A1 of the pixel region P and the third area A3 of the adjacent pixel region AP due to the bent part of each of the first pixel electrode 360 and the first common electrode 363. As a result, deterioration such as a color shift phenomenon is prevented.

In addition, since each of the second pixel electrode 368 and the second common electrode 365 in the second area A2 does not have the bent part, a disclination area is reduced in the second area A2 as compared with the first embodiment. As a result, aperture ratio and brightness of a two-dimensional image are improved in a 2D mode.

Moreover, since the end portions of the first and second pixel electrodes 360 and 368 in the first and second areas A1 and A2 overlap the first and second common lines CL1 and CL2 to eliminate a gap, a disclination area is further reduced. In addition, no common line is formed between the first and second gate lines GL1 and GL2, a gap distance between the first and second gate lines GL1 and GL2 are reduced as compared with the first embodiment. As a result, aperture ratio and brightness are further improved.

First and second thin film transistors (TFTs) Tr1 and Tr2 are connected to the first and second gate lines GL1 and GL2, respectively. Each of the first and second TFTs Tr1 Tr2 includes a gate electrode, a semiconductor layer over the gate electrode and source and drain electrodes on the semiconductor layer.

A portion of the first gate line GL1 functions as the gate electrode of the first TFT Tr1 and the source electrode 333 of the first TFT Tr1 is connected to the first data line DL1. In addition, the first and second drain electrodes 336 and 337 of the first TFT Tr1 are spaced apart from the source electrode 333 having a "W" shape to constitute two channels in the first TFT Tr1.

A portion of the second gate line GL2 functions as the gate electrode of the second TFT Tr2 and the source electrode 338 of the second TFT Tr2 is electrically connected to the first and second common lines CL1 and CL2. In addition, the drain electrode 340 of the second TFT Tr2 is spaced apart from the source electrode 338 of the second TFT Tr2 and is connected to the second drain electrode 337 of the first TFT Tr1.

The first pixel electrode 360 in the first area A1 is connected to the first drain electrode 336 of the first TFT Tr1 through a first contact hole CH1, and a first connection pattern 359 is connected to the second drain electrode 337 of the first TFT Tr1 through a second contact hole CH2. The first connection pattern 359 is connected to the second pixel electrode 368 in the second area A2. A second connection pattern 370 is connected to the source electrode 338 of the second TFT Tr2 through a third contact hole CH3. The first and second pixel electrodes 360 and 368 may have the same material and the same layer as the first and second common electrodes 363 and 365. In addition, the first and second connection patterns 359 and 370 may have the same material and the same layer as the first and second pixel electrodes 360 and 368 and the first and second common electrodes 363 and 365.

The second area A2 may be driven independently of the first area A1 and may be selectively driven according to a driving mode of the LCD device by turning on or off the second TFT Tr2. When the LCD device is driven in a 2D mode where a two-dimensional image is displayed, the first TFT Tr1 is turned on and the second TFT Tr2 is turned off. As a result, a data voltage of the first data line DL1 is applied to the first pixel electrode 360 in the first area A1 and the second pixel electrode 368 in the second area A2 through the first TFT Tr1, and a common voltage of the first and second common lines CL1 and CL2 is applied to the first common electrode 363 in the first area A1 and the second common electrode 365 in the second area A2. Accordingly, both the first and second areas A1 and A2 of the pixel region P display a full-colored image in a 2D mode.

When the LCD device is driven in a 3D mode where a three-dimensional image is displayed, the first and second TFTs Tr1 and Tr2 are turned on. As a result, the data voltage of the first data line DL1 is applied to the first pixel electrode 360 in the first area A1, and the common voltage of the first and second common lines CL1 and CL2 is applied to the first common electrode 363 in the first area A1 and the second common electrode 365 in the second area A2. Since the second TFT Tr2 is turned on, the common voltage of the source electrode 338 of the second TFT Tr2 is transmitted to the drain electrode 340 of the second TFT Tr2. Accordingly, since the common voltage of the first and second common lines CL1 and CL2 instead of the data voltage of the first data line DL1 is applied to the second pixel electrode 368 in the second area A2, the second area A2 displays a black image. Therefore, the first area A1 of the pixel region P displays a full-colored image and the second area A2 of the pixel region P functions as a black stripe for preventing deterioration such as a three-dimensional crosstalk in a 3D mode.

In the IPS mode LCD device including the array substrate 301, since the first and second areas A1 and A2 are used for displaying a two-dimensional image, aperture ratio and brightness of a two-dimensional image are improved in a 2D mode. In addition, since first area A1 is used for displaying a three-dimensional image and the second area A2 is used as a black stripe, display quality of a three-dimensional image is improved in a 3D mode.

Moreover, since each of the second pixel electrode 368 and the second common electrode 365 in the second area A2 does not have the bent part and the end portions of the first and second pixel electrodes 360 and 368 in the first and second areas A1 and A2 overlap the first and second common lines CL1 and CL2 to eliminate a gap, a disclination area is reduced and aperture ratio and brightness of a two-dimensional image are further improved in a 2D mode.

Figure 7:
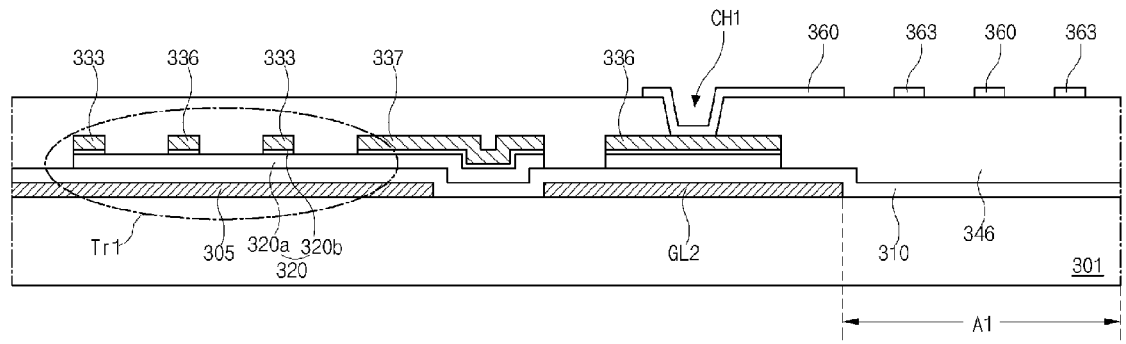
FIG. 7 is a cross-sectional view taken along a line VII-VII of FIG. 6 according to one embodiment.

FIG. 7 is a cross-sectional view taken along a line VII-VII of FIG. 6 according to one embodiment.

In FIG. 7, first and second gate lines GL1 and GL2 (of FIG. 6) and first and second common lines CL1 and CL2 (of FIG. 6) are formed on a substrate 301. The first and second gate lines GL1 and GL2 and the first and second common lines CL1 and CL2 are spaced apart from and parallel to each other. A portion of the first gate line GL1 functions as a gate electrode 305 of a first thin film transistor (TFT) Tr1 and a portion of the second gate line GL2 functions as a gate electrode of a second TFT Tr2 (of FIG. 6).

A gate insulating layer 310 of an inorganic insulating material such as silicon oxide (SiOx) and silicon nitride (SiNx) is formed on the first and second ate lines GL1 and GL2, the first and second common lines CL1 and CL2 and the gate electrode 305.

A semiconductor layer 320 including an active layer 320a and an ohmic contact layer 320b is formed on the gate insulating layer 310 over the gate electrode 305 of the first TFT Tr1. The active layer 320a may include intrinsic amorphous silicon and the ohmic contact layer 320b may include impurity-doped amorphous silicon. Although not shown, the other semiconductor layer is formed on the gate insulating layer 310 over the gate electrode of the second TFT Tr2.

In addition, first and second data lines DL1 and DL2 are formed on the gate insulating layer 310. The first and second data lines DL1 and DL2 cross the first and second gate lines GL1 and GL2 and the first and second common lines CL1 and CL2 and are spaced apart from each other. A pixel region P (of FIG. 6) is defined as an area surrounded by the first and second data lines DL1 and DL2 and the first and second common lines CL1 and CL2. The pixel region P includes a first area A1 surrounded by the first and second data lines DL1 and DL2, the second gate line GL2 and the first common line CL1 and a second area A2 (of FIG. 6) surrounded by the first and second data lines DL1 and DL2, the first gate line GL1 and the second common line CL2.

A source electrode 333, a first drain electrode 336 and a second drain electrode 337 are formed on the semiconductor layer 320 of the first TFT Tr1. The source electrode 333 is spaced apart from the first and second drain electrodes 336 and 337. The source electrode 333 of the first TFT Tr1 has a "W" shape and the first and second drain electrodes 336 and 337 correspond to two "U" shapes, respectively, of the "W" shape to constitute two channels in the first TFT Tr1. The source electrode 333 of the first TFT Tr1 is connected to the first data line DL1 and the first and second drain electrodes 336 and 337 of the first TFT Tr1 are spaced apart from each other.

Further, a source electrode 338 (of FIG. 6) and a drain electrode 340 (of FIG. 6) are formed on the other semiconductor layer of the second TFT Tr2. The source electrode 338 of the second TFT Tr2 has a "U" shape and is electrically connected to the first and second common lines CL1 and CL2. The drain electrode 340 of the second TFT Tr2 is spaced apart from the source electrode 338 of the second TFT Tr2 and is connected to the second drain electrode 337 of the first TFT Tr1.

The gate electrode 305, the gate insulating layer 310, the semiconductor layer 320, the source electrode 333 and the first and second drain electrodes 336 and 337 constitute the first TFT Tr1, and the gate electrode, the gate insulating layer 310, the other semiconductor layer, the source electrode 338 and the drain electrode 340 constitute the second TFT Tr2.

A passivation layer 346 of an organic insulating material such as photo acryl is formed on the first and second data lines DL1 and DL2, the source electrode 333 and the first and second drain electrodes 336 and 337 of the first TFT Tr1 and the source electrode 338 and the drain electrode 340 of the second TFT Tr2. The passivation layer 346 may be formed to have a relatively low dielectric constant so that a parasitic capacitance between the first and second data lines DL1 and DL2 and a second connection pattern 370 can be minimized.

The passivation layer 346 includes a first contact hole CH1 exposing the first drain electrode 336, a second contact hole CH2 exposing the second drain electrode 337 of the first TFT Tr1 and a third contact hole CH3 (of FIG. 6) exposing the source electrode 338 of the second TFT Tr2. Further, the passivation layer 346 and the gate insulating layer 310 includes a fourth contact hole CH4 (of FIG. 6) exposing the first and second common lines CL1 and CL2.

First and second pixel electrodes 360 and 368 (of FIG. 6), first and second common electrodes 363 and 365 (of FIG. 6) and first and second connection patterns 359 and 370 (of FIG. 6) of a transparent conductive material such as indium-tin oxide (ITO) and indium-zinc-oxide (IZO) are formed on the passivation layer 346. The first pixel electrode 360 and the first common electrode 363 spaced apart from each other are alternately disposed in the first area A1, and the second pixel electrode 368 and the second common electrode 365 spaced apart from each other are alternately disposed in the second area A2 (of FIG. 6). Each of the first and second pixel electrodes 360 and 368 and the first and second common electrodes 363 and 365 has a bar shape.

The first pixel electrode 360 in the first area A1 is connected to the first drain electrode 336 of the first TFT Tr1 through the first contact hole CH1. The second pixel electrode 368 in the second area A2 is connected to the second drain electrode 337 of the first TFT Tr1 and the drain electrode 340 of the second TFT Tr2 through the first connection pattern 359. The first and second common electrodes 363 and 365 are electrically connected to the first and second common lines CL1 and CL2, respectively, through the fourth contact hole CH4. The second connection pattern 370 overlaps the first and second data lines DL1 and DL2 and is connected to the second common line CL2.

Figure 8:
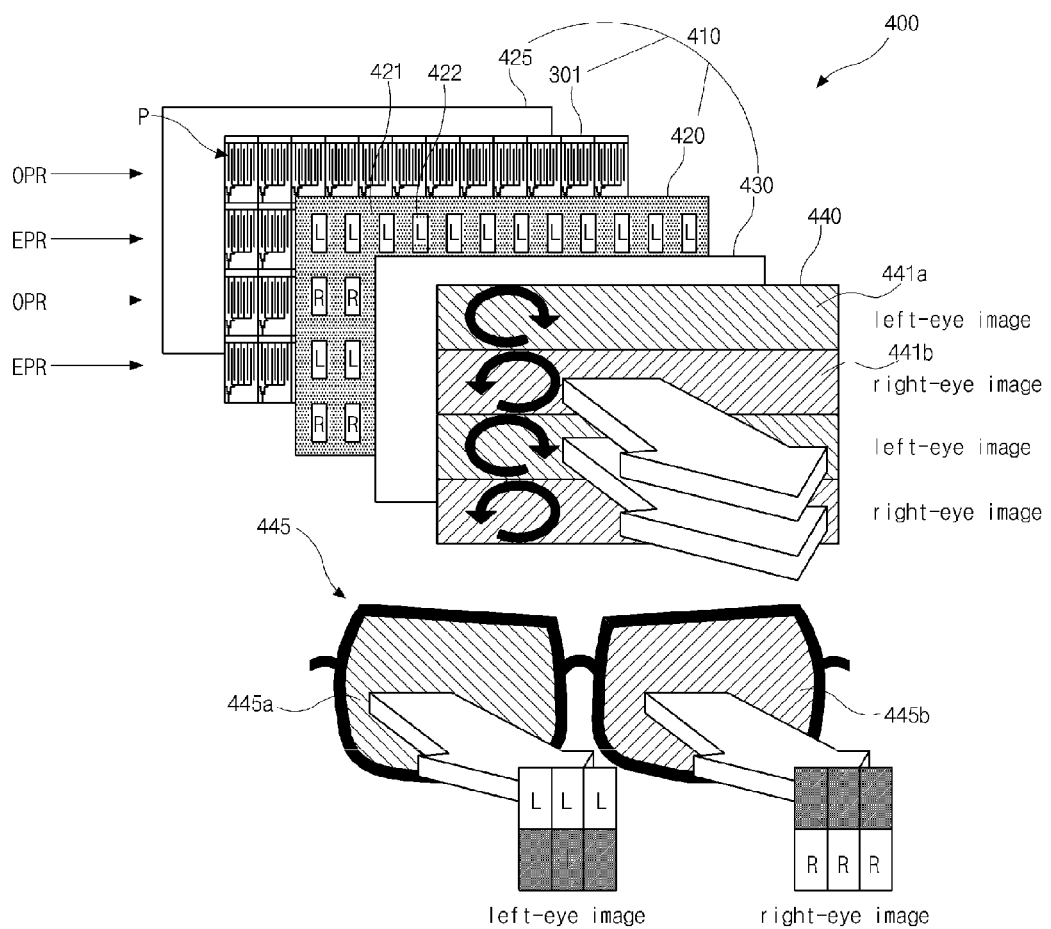
FIG. 8 is an exploded perspective view showing a three-dimensional image display device including an array substrate according to the second embodiment.

FIG. 8 is an exploded perspective view showing a three-dimensional image display device including an array substrate according to the second embodiment.

In FIG. 8, a three-dimensional image display device 400 includes a liquid crystal panel 410, a patterned retarder 440 on an outer surface of the liquid crystal panel 410 and a pair of glasses 445 selectively transmitting images from the liquid crystal panel 410 through the patterned retarder 440. The liquid crystal panel 410 includes first and second substrates 301 and 420, a liquid crystal layer (not shown), first and second polarizing plates 425 and 430 and a backlight unit (not shown). The first and second substrates 301 and 420 face into and are spaced apart from each other, and the liquid crystal layer is formed between the first and second substrates 301 and 420. The substrate of FIG. 6 is used as the first substrate 301 of the liquid crystal panel 410. For example, the first and second gate lines GL1 and GL2 (of FIG. 6), the first and second data lines DL1 and DL2 (of FIG. 6), the first and second common lines CL1 and CL2 (of FIG. 6), the first and second TFT Tr1 and Tr2 (of FIG. 6), the first and second pixel electrodes 360 and 368 and the first and second common electrodes 363 and 365 are formed on an inner surface of the first substrate 301.

A black matrix 421 and a color filter layer 422 are formed on an inner surface of the second substrate 420. The black matrix 421 corresponds to a border of the pixel region P (of FIG. 6), and the color filter layer 422 includes red, green, and blue color filters each corresponding to the pixel region P. An overcoat layer may be formed on the color filter layer 422 for planarization. The liquid crystal layer is formed between the first and second substrates 301 and 420. The first and second polarizing plates 425 and 430 are formed on outer surfaces of the first and second substrates 401 and 420, respectively. A transmission axis of the first polarizing plate 425 may be perpendicular to a transmission axis of the second polarizing plate 430. In addition, the backlight unit is disposed on an outer surface of the first polarizing plate 425.

The pixels P of the liquid crystal panel 410 are disposed along odd and even pixel rows OPR and EPR. The pixels in the odd pixel rows OPR display a left-eye image and the pixels in the even pixel rows EPR display a right-eye image. The black matrix 421 corresponds to a boundary between the odd and even pixel rows OPR and EPR.

The patterned retarder 440 may be formed of a birefractive material and may have first and second regions 441$a$ and 441$b$ alternating each other. The first and second regions 441$a$ and 441$b$ may correspond to odd and even pixel rows, respectively, of the liquid crystal panel 410 and may change polarization states of light passing through the second polarizing plate 430. For example, the first region 441$a$ may change the linearly polarized light passing through the second polarizing plate 430 into a right-handed circularly polarized light and the second region 441$b$ may change the linearly polarized light passing through the second polarizing plate 430 into a left-handed circularly polarized light. The patterned retarder 440 may have a phase difference of $\lambda/4$ (quarter wave). In addition, an optical axis of the patterned retarder 440 may have one of about +45° and about −45° with respect to a transmission axis of the second polarizing plate 430.

Accordingly, the left-handed circularly polarized light of the left-eye image is emitted from the first region 441$a$ corresponding to the odd pixel rows OPR and the right-handed circularly polarized light of the right-eye image is emitted from the second region 441$b$ corresponding to the even pixel rows EPR.

The pair of glasses 445 includes lenses 445$a$ and 445$b$ of a transparent glass, polarizing films (not shown) and retardation films (not shown) having a phase difference of $\lambda/4$ (quarter wave). For example, a left-eye retardation film of $\lambda/4$ (not shown) and a left-eye polarizing film may be sequentially formed on an inner surface of a left-eye lens 445$a$ and a right-eye retardation film of $\lambda/4$ (not shown) and a right-eye polarizing film may be sequentially formed on an inner surface of a right-eye lens 445$b$. Each of the retardation films of $\lambda/4$ changes the circularly polarized light into a linearly polarized light and each of the polarizing films 450$a$ and 450$b$ filters the linearly polarized light according to a polarization axis.

As a result, when a user wearing the pair of glasses 445 watches the images displayed by the liquid crystal panel 410 through the patterned retarder 440, the left-eye image and the right-eye image selectively pass through the left-eye lens 445$a$ and the right-eye lens 445$b$, respectively, and the user recognizes a three-dimensional image by combining the left-eye image and the right-eye image.

Figure 9A:
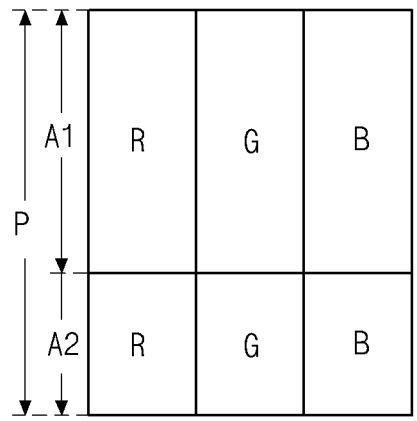
FIGS. 9A and 9B are views showing a pixel region of a three-dimensional image display device in a 2D mode and a 3D mode, respectively, according to the first and second embodiments.
Figure 9B:
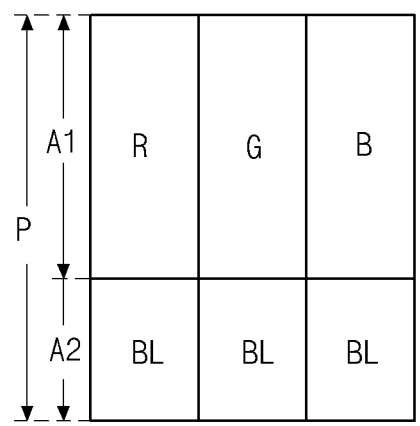
Figure 10A:
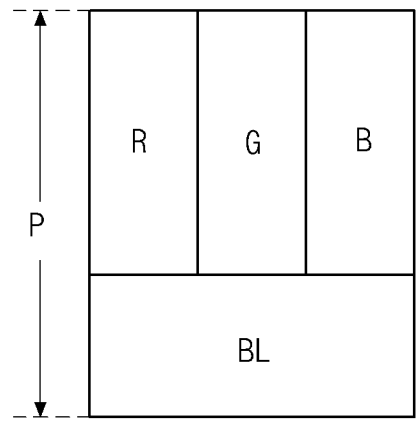
FIGS. 10A and 10B are views showing a pixel region of a three-dimensional image display device in a 2D mode and a 3D mode, respectively, according to the related art.
Figure 10B:
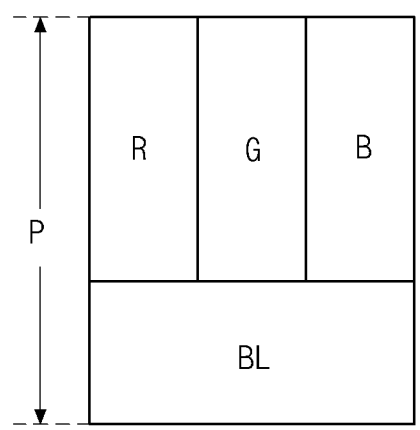

FIGS. 9A and 9B are views showing a pixel region of a three-dimensional image display device in a 2D mode and a 3D mode, respectively, according to the first and second embodiments. FIGS. 10A and 10B are views showing a pixel region of a three-dimensional image display device in a 2D mode and a 3D mode, respectively, according to the related art.

In FIG. 9A, when a three-dimensional image display device according to the first and second embodiment is driven in a 2D mode, each of first and second areas A1 and A2 of a pixel region P displays a full-colored image including red R, green G, and blue B colors. As a result, aperture ratio and brightness of a two-dimensional image is improved.

In FIG. 9B, when the three-dimensional image display device is driven in a 3D mode, the first areas A1 of the pixel region P displays a full-colored image including red R, green G, and blue B colors and the second area A2 of the pixel region P displays a black image including black color BL. Since the second area A2 of the pixel region P functions as a black stripe for preventing a left-eye image and a right-eye image from being mixed, deterioration such as a three-dimensional crosstalk is prevented and display quality of a three-dimensional image is improved.

In FIGS. 10A and 10B, when a three-dimensional image display device according to the related art is driven in a 2D mode and a 3D mode, a first area A1 of a pixel region P displays a full-colored image including red R, green G, and blue B colors and a second area A2 of the pixel region P displays a black image including a black color BL. As a result, although display quality of a three-dimensional image is improved, aperture ratio and brightness of a two-dimensional image is reduced.

In an array substrate for a liquid crystal panel of a three-dimensional image display device according to the present disclosure, a pixel region includes first and second areas. When the three-dimensional image display device is driven in a 3D mode, the first area displays a full-colored image and the second area displays a black image. As a result, display quality of a three-dimensional image is improved. In addition, when the three-dimensional image display device is driven in a 2D mode, both the first and second areas display a full-colored image. As a result, aperture ratio and brightness of a two-dimensional image are improved.

Moreover, each of a first pixel electrode and a first common electrode in the first area has a bent part and each of a second pixel electrode and a second common electrode in the second area does not have a bent part. As a result, deterioration such as a color shift is prevented and a disclination area is reduced. In addition, since a common line is formed in a disclination area, aperture ratio and brightness are further improved.

It will be apparent to those skilled in the art that various modifications and variations can be made in an array substrate of the present disclosure without departing from the sprit or scope of the invention. Thus, it is intended that the present invention covers the modifications and variations of this invention provided they come within the scope of the appended claims and their equivalents.

What is claimed is:

1. An array substrate for a liquid crystal display device, comprising:
    a substrate;
    first and second gate lines on the substrate, the first and second gate lines parallel to and spaced apart from each other;
    first and second common lines parallel to and spaced apart from the first and second gate lines;
    first and second data lines crossing the first and second gate lines and the first and second common lines, wherein a pixel region is surrounded by the first and second data lines and the first and second common lines, wherein the pixel region includes a first area surrounded by the first and second data lines, the second gate line and the first common line and a second area surrounded by the first and second data lines, the first gate line and the second common line, and wherein the first area has a two-domain structure and the second area has a mono-domain structure;
    first and second thin film transistors in the pixel region, the first and second thin film transistors connected to the first and second gate lines, respectively;
    a first pixel electrode and a first common electrode alternately disposed in the first area, at least one of the first pixel electrode and the first common electrode having a bent part; and
    a second pixel electrode and a second common electrode alternately disposed in the second area.

2. The array substrate according to claim 1, wherein the first thin film transistor includes first and second drain electrodes spaced apart from each other, and wherein the second drain electrode of the first thin film transistor is electrically connected to the first pixel electrode and a drain electrode of the second thin film transistor.

3. The array substrate according to claim 2, wherein the second drain electrode is electrically connected to the second pixel electrode through a first connection pattern.

4. The array substrate according to claim 3, wherein a source electrode of the second thin film transistor is electrically connected to the second common line through a second connection pattern.

5. The array substrate according to claim 1, wherein the bent part is disposed at a biased portion of the at least one of the first pixel electrode and the first common electrode.

6. The array substrate according to claim 5, wherein the bent part is disposed at a center portion of a united region of the first area of the pixel region and the second area of an adjacent pixel region.

7. The array substrate according to claim 1, wherein an end portion of the first pixel electrode overlaps the first common line and an end portion of the second pixel electrode overlaps the second common line.

8. The array substrate according to claim 1, wherein the second area is driven independently of the first area.

9. The array substrate according to claim 1, wherein the second area displays one of a full-colored image and a black image according to a driving mode of the liquid crystal display device.

10. The array substrate according to claim 1, wherein the first and second thin film transistors are connected to the first and second data lines, respectively.

11. A three-dimensional (3D) image display device, comprising:
    a liquid crystal panel including first and second substrates facing and spaced apart from each other and a liquid crystal layer between the first and second substrates,
    wherein the first substrate comprises:
        first and second gate lines on the first substrate, the first and second gate lines parallel to and spaced apart from each other;
        first and second common lines parallel to and spaced apart from the first and second gate lines;
        first and second data lines crossing the first and second gate lines and the first and second common lines, wherein a pixel region is surrounded by the first and second data lines and the first and second common lines, wherein the pixel region includes a first area surrounded by the first and second data lines, the second gate line and the first common line and a second area surrounded by the first and second data lines, the first gate line and the second common line, and wherein the first area has a two-domain structure and the second area has a mono-domain structure;

first and second thin film transistors in the pixel region, the first and second thin film transistors connected to the first and second gate lines, respectively;

a first pixel electrode and a first common electrode alternately disposed in the first area, at least one of the first pixel electrode and the first common electrode having a bent part; and a second pixel electrode and a second common electrode alternately disposed in the second area, and wherein the second substrate includes a color filter layer;

first and second polarizing plates on outer surfaces of the first and second substrates, respectively;

a backlight unit on an outer surface of the first polarizing plate; and a patterned retarder on an outer surface of the second polarizing plate, the patterned retarder having a phase difference of $\lambda/4$.

12. The three-dimensional image display device according to claim 11, wherein the three-dimensional display device is driven in one of a two-dimensional (2D) mode and a 3D mode.

13. The three-dimensional image display device according to claim 12, wherein both the first and second areas display a full-colored image in the 2D mode.

14. The three-dimensional image display device according to claim 13, wherein the second thin film transistor is turned off in the 2D mode.

15. The three-dimensional image display device according to claim 12, wherein the first area displays a full-colored image and the second area displays a black image in the 3D mode.

16. The three-dimensional image display device according to claim 15, wherein the second thin film transistor is turned on in the 3D mode.

17. The three-dimensional image display device according to claim 11, wherein the first and second thin film transistors are connected to the first and second data lines, respectively.

* * * * *